(12) United States Patent
DeLuca

(10) Patent No.: US 11,276,321 B2
(45) Date of Patent: Mar. 15, 2022

(54) METHOD AND SYSTEM TO TRAIN USERS INTERACTING WITH A SEARCH ENGINE

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/805,238

(22) Filed: Nov. 7, 2017

(65) Prior Publication Data
US 2019/0139434 A1    May 9, 2019

(51) Int. Cl.
| | | |
|---|---|---|
| G09B 7/04 | (2006.01) | |
| G09B 5/02 | (2006.01) | |
| G06F 16/951 | (2019.01) | |
| G06F 16/9532 | (2019.01) | |
| G06F 16/332 | (2019.01) | |
| G09B 19/00 | (2006.01) | |

(52) U.S. Cl.
CPC ........... *G09B 7/04* (2013.01); *G06F 16/3322* (2019.01); *G06F 16/951* (2019.01); *G06F 16/9532* (2019.01); *G09B 5/02* (2013.01); *G09B 19/0053* (2013.01)

(58) Field of Classification Search
CPC ............ G09B 7/04; G09B 5/02; G06F 16/951
See application file for complete search history.

(56) References Cited

U.S. PATENT DOCUMENTS

| | | | | |
|---|---|---|---|---|
| 5,211,563 | A * | 5/1993 | Haga | G09B 5/14 434/322 |
| 6,775,518 | B2 * | 8/2004 | Norcott | G09B 5/06 434/118 |
| 8,688,602 | B1 * | 4/2014 | Murray | G06N 7/005 706/12 |
| 2006/0004738 | A1 * | 1/2006 | Blackwell | G06F 9/454 |
| 2006/0047649 | A1 * | 3/2006 | Liang | G06F 16/338 |
| 2006/0106793 | A1 * | 5/2006 | Liang | G06F 16/3329 |
| 2007/0061317 | A1 * | 3/2007 | Ramer | G06F 16/3322 |
| 2007/0156669 | A1 * | 7/2007 | Marchisio | G06F 16/951 |
| 2008/0021721 | A1 * | 1/2008 | Jones | G06Q 50/205 434/350 |
| 2008/0242279 | A1 * | 10/2008 | Ramer | G06F 16/951 455/414.2 |
| 2009/0125796 | A1 * | 5/2009 | Day | G06F 9/451 715/219 |

(Continued)

*Primary Examiner* — Robert P Bullington
*Assistant Examiner* — Sadaruz Zaman
(74) *Attorney, Agent, or Firm* — Schmeiser, Olsen & Watts, LLP; Stephanie Carusillo

(57) ABSTRACT

The present invention provides a method and system for training a user to use a complete sentence as a search query in a site level engine search. The user enters a keyword or partial keyword as a search query, then a list of sentences is found from a search history or online sources. The found sentences containing the keyword or partial keyword can be ordered by popularity of search and presented to the user along with a recommendation to use a sentence similar to a spoken sentence as a search query in order to obtain more accurate and detailed results.

17 Claims, 5 Drawing Sheets

(56) References Cited

U.S. PATENT DOCUMENTS

| | | | |
|---|---|---|---|
| 2010/0003658 A1* | 1/2010 | Fadel | G09B 7/02 434/322 |
| 2011/0043652 A1* | 2/2011 | King | G06F 40/194 348/222.1 |
| 2011/0314053 A1* | 12/2011 | Morikawa | G06Q 10/103 707/769 |
| 2014/0188935 A1 | 7/2014 | Vee et al. | |
| 2015/0193447 A1 | 7/2015 | Voinea et al. | |
| 2015/0206440 A1* | 7/2015 | Aylesworth | G09B 5/00 434/362 |
| 2016/0350321 A1 | 12/2016 | Garg et al. | |
| 2016/0366036 A1* | 12/2016 | Gupta | H04L 67/16 |
| 2017/0206250 A1* | 7/2017 | Loomans | G06Q 50/01 |

\* cited by examiner

METHOD AND SYSTEM TO TRAIN USERS INTERACTING WITH A SEARCH ENGINE

TECHNICAL FIELD

The invention relates generally to a method and system for the use by users of search engines on a computer, an Intranet or the Internet, and in particular to a method and system to aid in training users interacting with a search engine to interact with the search engine with natural language sentences rather than traditional keyword queries.

BACKGROUND

Conventional search engines accept and use keywords for initiating a search query on a search engine. Accordingly, there is a need for improved systems and methods to assist in training users to change the way they interact with a search engine to more closely approximate typical human speech and writing patterns when initiating a search.

SUMMARY

The present invention provides a method and system for training a user to use a complete sentence as a search query in a site level engine search. The user enters a keyword or partial keyword as a search query, then a list of sentences are found from a search history or online sources. The found sentences containing the keyword or partial keyword can be ordered by popularity and presented to the user along with a recommendation to use a sentence similar to a spoken or written sentence as a search query in order to obtain more accurate and detailed results.

A method to aid in training of users interacting with a site level search engine includes the steps of: a user, via a user interface of a computer having access to a search engine, entering one or more keywords or partial keywords as a search query to the search engine; determining, by the computer, a list of sentences of a human language from a search history of previous searches wherein each sentence contains the one or more keywords or partial keywords; and presenting, by the computer, to the user the list of sentences as suggested search queries for selection by the user to be submitted to the search engine.

A computer program product includes one or more computer readable hardware storage devices having computer readable program code stored therein. The program code contains instructions executable by a computing device to implement a method to aid in training of users interacting with a site level search engine. The method includes the steps of: a user, via a user interface of a computer having access to a search engine, entering one or more keywords or partial keywords as a search query to the search engine; determining, by the computer, a list of sentences of a human language from a search history of previous searches wherein each sentence contains the one or more keywords or partial keywords; and presenting, by the computer, to the user the list of sentences as suggested search queries for selection by the user to be submitted to the search engine.

A system includes a computing device which has one or more processors, one or more memories, and one or more computer readable hardware storage devices. The one or more hardware storage devices contain program code executable by the one or more processors via the one or more memories to implement a method to aid in training of users interacting with a site level search engine. The method includes the steps of: a user, via a user interface of a computer having access to a search engine, entering one or more keywords or partial keywords as a search query to the search engine; determining, by the computer, a list of sentences of a human language from a search history of previous searches wherein each sentence contains the one or more keywords or partial keywords; and presenting, by the computer, to the user the list of sentences as suggested search queries for selection by the user to be submitted to the search engine.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Figure 1:
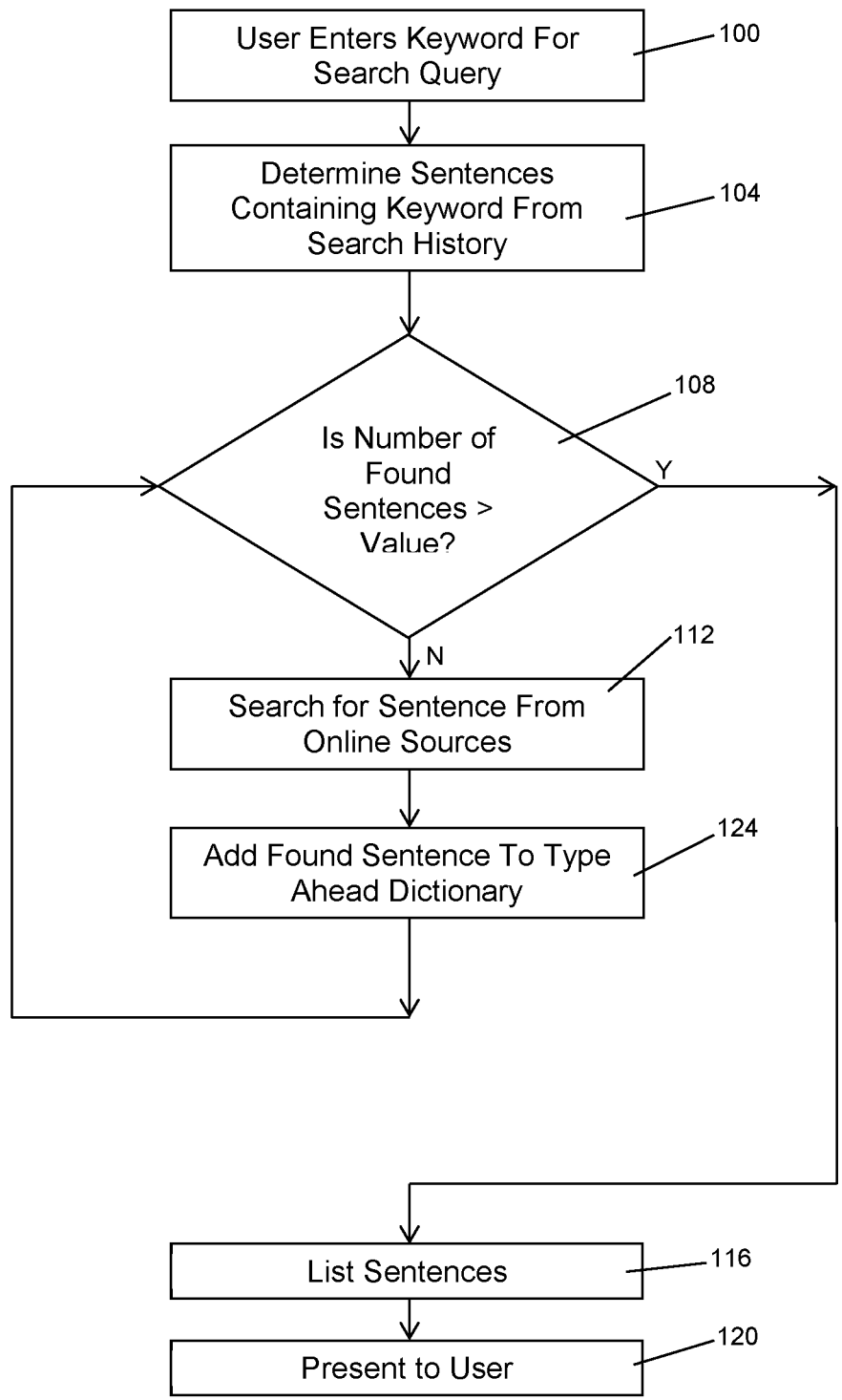
FIG. 1 is a flowchart diagram of a method according to a first embodiment of the present invention.

FIG. 1 is a flowchart diagram of a method according to a first embodiment of the present invention. In one preferred embodiment the method is carried out by software installed as server code for a search engine. A system administrator for the search engine can set up various default values and parameters.

For the purposes of this specification and claims, the following definitions will apply. A "sentence" is defined as a group of words as spoken or written by a person and combined according to predetermined syntax and semantics of a human language, such as English. A "sentence" is also referred to herein as a "full sentence", a "complete sentence", or a "natural language sentence" and all having the same meaning as defined above. "Syntax" is the arrangement of words and phrases to create well-formed sentences in a language. It is the way that words of a human language are put together in an orderly fashion to make sense. "Semantics" is defined as the meanings of words as used in sentences of a language. A "type-ahead dictionary of sentences" is typically resident on a server and is limited to sentences, rather than including single words or phrases as in a conventional dictionary.

Notably a sentence as defined above for the current invention includes a group of words combined according to predetermined syntax and semantics of a human language as spoken or written. There is a clear distinction between the prior art search engines that present search results as partial truncated sentence parts or phrases versus the search results of the current invention which presents sentences which can be written or spoken. For instance in prior art search engines, when a user types in "dog f" the search entry is expanded in a pull down menu to yield phrases or word groups for search selection by the user such as "dog food", "dog for sale" and "dog friendly beaches". These are all phrases or groups of words which are not equivalent to a sentence as defined herein. In contrast to the prior art search engines, the method of the current invention expands a user search entry of "dog f" to full sentence search results such as "What is the best dog food?", "What dogs are available for sale today?" and "Are there any dog friendly beaches near me?". By receiving these full sentence search results when typing in a keyword or partial keyword, the user then sees and realizes that he can enter full sentences going forward with his searches, thus training the user to use sentence searches which in turn provide more accurate and detailed results.

One of the advantages to the site of being queried with a full sentence rather than keywords is the site is able to interpret intent. For example, a search for "3D printer" doesn't tell the site if the user is looking to learn about the printer, get help on a previous purchased printer, or buy a new printer. But a full sentence such as "What is a 3D printer?" or "How is a 3D printer different from an ink jet printer" or "What types of 3D printers can I purchase" all suggest an intent of researching. A full sentence such as "I'd like to purchase a 3D printer" or "Show me 3D printers in stock" suggest the user has an intent where they are looking to make a purchase. Sentences such as "I need support for my 3D printer." Or "How do I install a filament for a 3D printer" suggests an intent where the user is looking for support. Therefore the content displayed to the user can be adjusted to more closely align with the type of content that matches each intent.

In step 100 of FIG. 1 a user typically begins an inquiry to a search engine on a server by entering a keyword or partial keyword via a user interface to a computer connected to the server. The server can be a site level server accessible via wireless communications such as the Internet or a local Intranet, or the server can be directly linked to the user's computer. In step 104, sentences containing the typed-in keyword or partial keyword are retrieved from the search history of the site level server.

If a sufficient number of sentences exceeding a predetermined Value is determined from the search history in step 108, then the process will continue to step 116. Otherwise, the process moves to step 112 to gather additional information. The predetermined Value is a positive integer number which can be set by the system administrator for the search engine. For instance, the administrator can set Value=0 in which case if one or more sentences are found in the search history to contain the keyword or partial keyword, then the found sentence(s) will be presented to the user. The Value can be set to a different integer value if decided by the system administrator, such as setting the Value=5 or the Value=10 to correspond with a maximum number of sentences available for presentation to the user via a pop-up window, pull-down menu list or equivalent from the search history.

When the number of sentences found in the search history is determined to be less than the preset Value in step 108, then additional sentences must be found or input by the user until the Value is met. In step 112, online sources are searched in an effort to find sentences which include the keyword or partial keyword input by the user. For instance an online source can be any database accessible via the search engine such as from the Internet, from local Intranet sources, from Facebook or other social service websites, from public or privately accessible websites to the user, etc.

When a sentence is found in step 112, it is then added in step 124 to a type-ahead sentence dictionary resident on the site server.

With the discovery and addition to the type-ahead sentence dictionary of each sentence containing a keyword or partial keyword as submitted by the user, the Value is again tested in step 108. Once the number of found sentences containing a keyword or partial keyword is determined to be greater than Value in step 108, then the sentences are listed in step 116 and presented to the user in step 120. The user then has the option of selecting one of the listed found sentences to initiate a search on the site level search engine.

When implementing the inventive method, if no search history is available, the system will learn over time and build up the type-ahead sentence dictionary as new searches are entered and more sentences containing keywords or partial keywords are found. For each search query entered by the user as either a keyword, partial keyword, or full sentence, the corresponding full sentence query is saved as part of the type-ahead dictionary. The term "full sentence" is intended to have the same meaning as the term "sentence" previously defined. For each "non-natural language query" (defined as a keyword or partial keyword), the non-natural language query is converted into a full natural language sentence query before being saved within the type-ahead dictionary on the site server.

The system administrator can set up the system so that a sentence is only presented to the user when a popularity threshold is met. For example, a keyword "fertilizer" is entered by the user and the system locates the five sentences listed below in the search history containing the keyword.

1. "What is the price of fertilizer?" searched 50 times, 20%
2. "Where can I buy fertilizer?" searched 61 times, 24%
3. "When is the best time to spread fertilizer onto my lawn" searched 112 time, 45%
4. "What is the best fertilizer for my lawn?" searched 20 times, 8%
5. "Will fertilizer lose it's effectiveness when stored?" searched 7 times, 3%

In this example the administrator has set the popularity threshold to 20% so that only sentences which have been searched more than 20% of the time containing the keyword "fertilizer" according to the search history will be presented to the user. Hence the three sentences containing the word "fertilizer" which reached the popularity threshold will be presented to the user. Optionally the keyword or partial keyword entered by the user can be highlighted as illustrated in the list above when presented in a sentence to the user.

Search terms can be run through global searches outside of the site level to find sentences in which keywords or partial keywords are present to suggest a natural language sentence query. For example, if the user enters the keyword search term "IPhone 7" and the keyword is searched for use in sentences throughout a corpus of crawled content sites, the system might determine that the most popular sentence using that term might be "I'm looking to purchase an IPhone 7". That full sentence can be presented to the user and/or automatically entered into the type-ahead dictionary. Alternatively, the system can be set up so that the top 4 found sentences can be presented to the user such as (1) "I'm looking to purchase an IPhone 7", (2) "Protective cases that are compatible with an IPhone 7", (3) "How much does an IPhone 7 cost", and (4) "Which cellphone providers support IPhone 7". The sentences can be buttressed to ensure proper meaning with padding words such as who, what, where and how.

The system can also be set up to allow a user to enter a full sentence, or to approve the addition of a sentence to the type-ahead sentence dictionary. In that way, natural language sentence queries can be directly entered into the type-ahead sentence dictionary by the user.

In the following example James is searching on a retail store website called Store.com and he types in "laser printer" which is submitted to the search engine for Store.com (i.e. a site level search engine). Without the use of the current inventive method, the results presented to James from his search is:

laser printer ink
all-in-one laser printer
laser printer scanner
Brand A laser printer
Brand B laser printer
laser printer comparison.

In order to train James on how to use full natural language sentences which offer more focused and semantically accurate results, the current inventive method will present the following search result sentences to James:

What laser printers are available at Store.com?
Do laser printers have a built in scanner?
Can I send a fax from a laser printer?
How much does a Brand A laser printer cost?
Show me the difference between available laser printers.
Which Brand B laser printers cost less than $200?

James is in discovery mode and, from viewing the full sentence search results that are presented to him, he realizes that he can type in a search query as if he is speaking to a person. Thus he is likely to enter a new search query as a sentence to more accurately define the intent of his search. In this way, the method of the invention is training the user James to search using full sentences as used during speech or writing. For instance he might enter the search query, "What is an all-in-one laser printer?" which would yield content documents explaining what is meant by an all-in-one printer as well as providing a list of all-in-one laser printers that are available at Store.com. In addition to providing more accurate search results, the method can also minimize search times by focusing the results to the more detailed meaning of a sentence, rather than to a broad keyword search.

Figure 2:
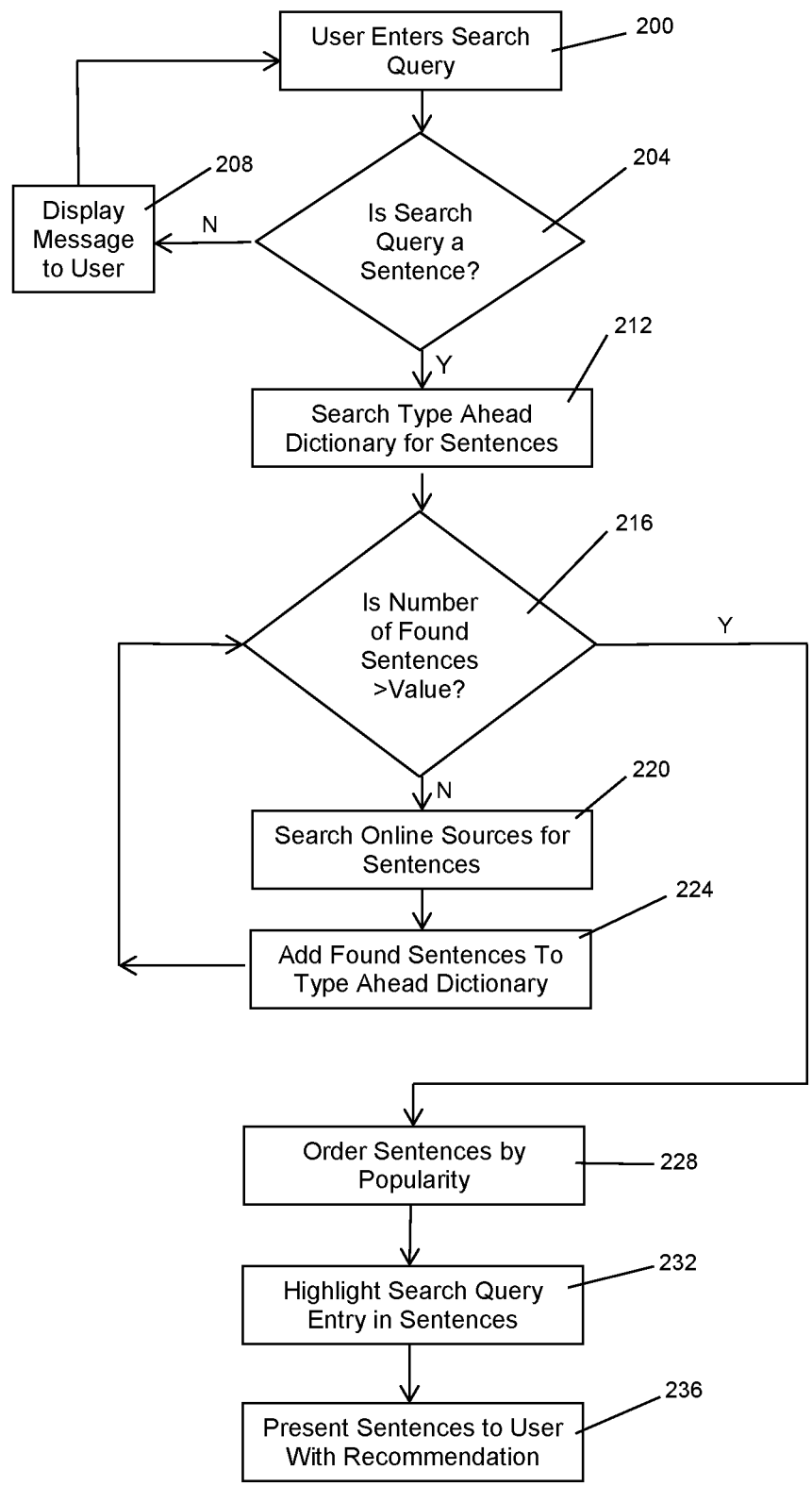
FIG. 2 is a flowchart diagram of a method according to a second embodiment of the present invention.

FIG. 2 is a flowchart diagram of a method according to a second embodiment of the present invention. The user enters a search query in step 200 and step 204 determines whether the search query is a sentence. If the search query is not a sentence, such as being only a keyword, partial keyword, phrase or partial sentence, then a message is displayed per step 208 to the user on his computer monitor/display suggesting that the user should enter a full sentence search query. An example of a full sentence could also be presented on the user display along with the suggestion. If the user's search query is identified as a sentence in decision step 204, then the method continues to step 212.

Many well known methods are available for identifying whether a group of words is a sentence as defined herein to be a group of words combined according to predetermined syntax and semantics of a human language as spoken or written. For instance, a sentence will typically form a syntactic unit which expresses an assertion, a question, a command, a wish, an exclamation, or the performance of an action, that in writing usually begins with a capital letter and concludes with appropriate end punctuation.

When the user's search query is determined to be a sentence in step 204, then the type-ahead dictionary of the site level search engine is searched for similar sentences, for instance for similar products or content. For example if a user enters the search query sentence "I need dog food for a poodle", then the method will search for and find related sentences in the type-ahead dictionary having similar meaning and/or language. Perhaps other sentences from the dictionary would include "Where can I buy dog food for a poodle" and "What is the best poodle dog food?". If the number of found sentences in step 216 is determined to be greater than a predetermined Value, then the process continues to step 228. If the Value is not met in step 216, then online sources are searched in step 220 in an effort to find similar sentences to the search query entered by the user. An online source can be any database accessible via the search engine such as from the Internet, from local Intranet sources, from Facebook or other social service websites, from public or privately accessible web sites to the user, etc. When sentences are found in step 220, then they are added in step 224 to the type-ahead sentence dictionary resident on the site server. Again the number of found sentences is compared to the predetermined Value in step 216 until the Value is met.

Once the predetermined Value is met in step 216, then the found sentences in step 228 are ordered and listed by popularity so that the sentence which is most frequently searched is on the top of the list and the sentence which is least frequently searched is on the bottom of the list. Words from the search query entered by the user can be highlighted in each of the listed sentences in step 232. Finally the found sentences are presented in step 236 to the user on his display/monitor with the sentences ordered according to the popularity threshold and including highlighted words from the user's search query. A recommendation can also be presented to the user such as a recommendation to enter a subsequent search query as one would speak or write a sentence.

Figure 3A:
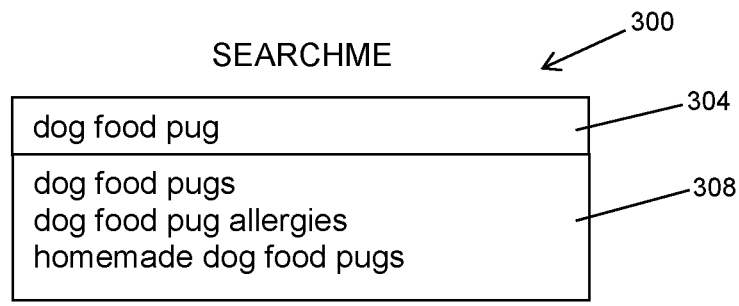
FIG. 3A is a prior art screen shot example of a search inquiry and results of a conventional search engine.

FIG. 3A is a prior art screen shot example of a search inquiry and results of a conventional search engine. The screen shot 300 of the SEARCHME search engine includes the search inquiry "dog food pug" which was input by the user such as by being typed into the search inquiry field 304. The conventional results of the search are displayed as groups of words or phrases in the pull down search results field 308. The search results consists of groups of words that typically are linked together, but which are not ordered together in the manner of a natural language sentence according to predetermined syntax and semantics of a human language. None of the prior art search results fits the definition of a sentence as defined herein.

Figure 3B:
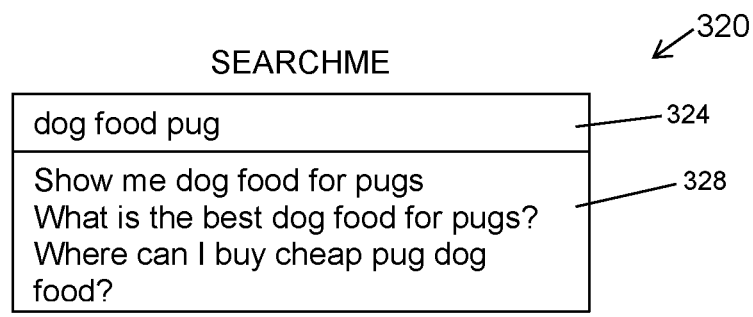
FIG. 3B is a screen shot example of a search inquiry and full sentence search results according to the present invention.

FIG. 3B is a screen shot example of a search inquiry and full sentence search results according to the present invention. The screen shot 320 of the SEARCHME search engine includes the search inquiry "dog food pug" which was input by the user into the search inquiry field 324. The results of the search inquiry in accordance with the method of the present invention are displayed as full natural language sentences in the pull down search results field 328. By displaying natural language sentences as search results, the user is made aware that he can enter a full sentence search inquiry in order to obtain more accurate results according to the intent of his search. Of course the intent of the user's search inquiry can be more clearly determined and more thoroughly researched and searched if he uses a full natural language sentence as a search inquiry rather a few keywords, thus the aiding and subliminal training of the user to input a sentence as a search inquiry to a search engine is an advancement over the prior art.

Figure 4:
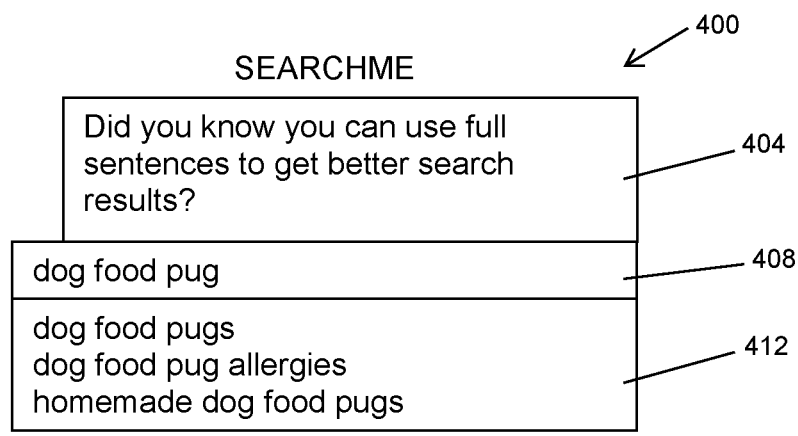
FIG. 4 is a screen shot example of a search inquiry with a specific pop-up message to the user recommending the use of a full sentence search inquiry according to the present invention.

FIG. 4 is a screen shot example of a search inquiry with a specific pop-up message to the user suggesting to him to use a full sentence search inquiry according to the present invention. The screen shot 400 of the SEARCHME search engine includes the search inquiry "dog food pug" which was input by the user such as by being typed into the search inquiry field 408. The conventional search results are displayed in the pull down search results field 412. Moreover in accordance with the method of the current invention, a pop-up message is presented to the user in the pop-up window 404 which informs the user that using a full sentence search inquiry will yield better search results. Of course the message in the pop up window 404 could have different wording. Also, the method of the current invention could present the user with an instruction (rather than a recommendation) such as "Please enter a complete sentence for your search inquiry". The method could optionally delay search results (as shown in 412) from being immediately presented to the user, for example, delaying the display of the pull down search results for some period of time, e.g. 2 seconds.

Figure 5:
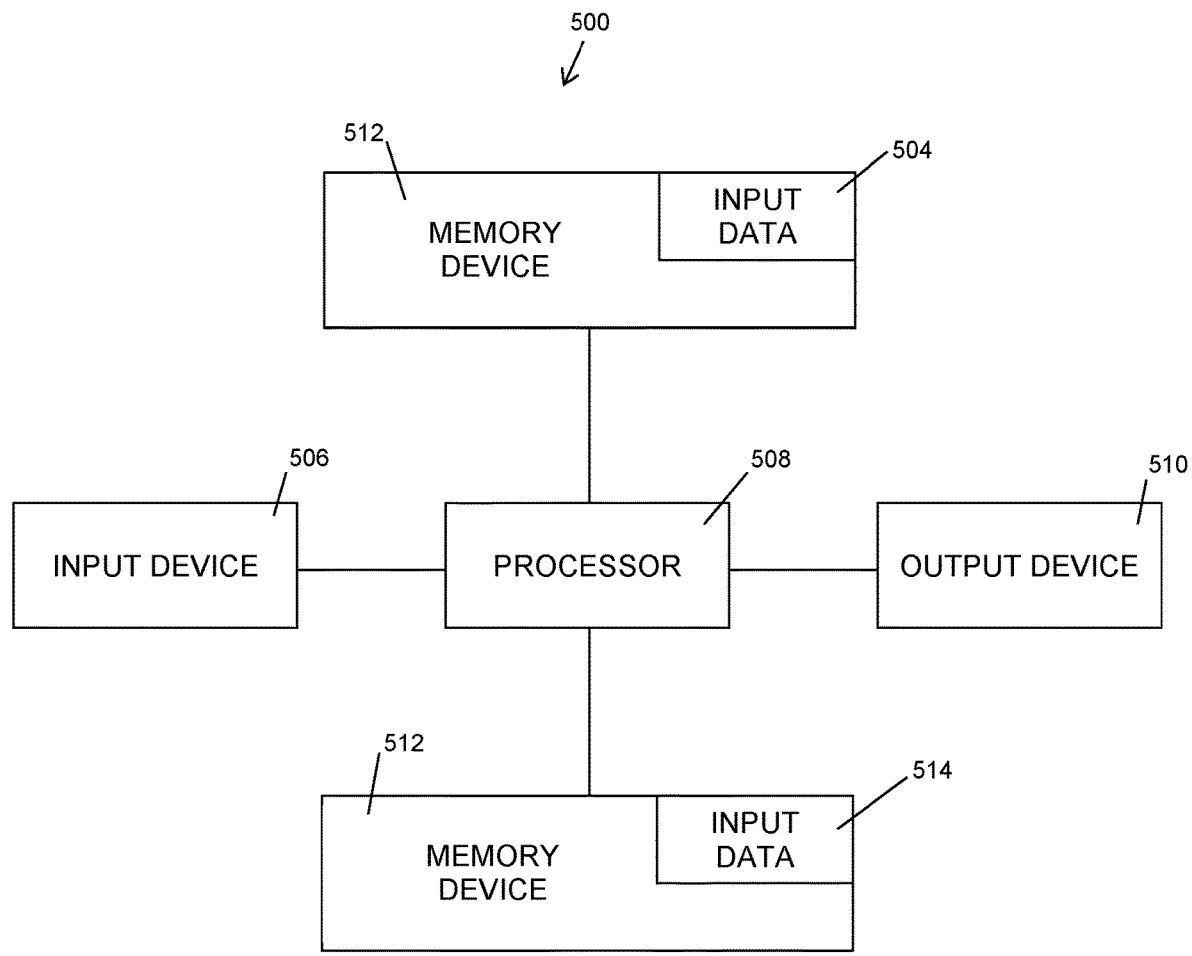
FIG. 5 is a block diagram of a computer system for implementing a method in accordance with embodiments of the present invention.

FIG. 5 is a block diagram of a computer system for implementing a method in accordance with embodiments of the present invention. The computing device 500 includes a processor 508, an input device 506 coupled to the processor 508, an output device 510 coupled to the processor 508, and memory devices 502 and 512 each coupled to the processor 508. The input device 506 may be, inter alia, a keyboard, a mouse, etc. The output device 510 may be, inter alia, a printer, a plotter, a computer screen, a magnetic tape, a removable hard disk, a floppy disk, etc. The memory devices 502 and 512 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 512 includes a computer code 514 which is a computer program that includes computer-executable instructions.

The computer code 514 includes software or program instructions that may implement an algorithm for implementing methods of the present invention. The processor 508 executes the computer code 514. The memory device 502 includes input data 504. The input data 504 includes input required by the computer code 514. The output device 510 displays output from the computer code 514. Either or both memory devices 502 and 512 (or one or more additional memory devices not shown) may be used as a computer usable storage medium (or program storage device) having a computer readable program embodied therein and/or having other data stored therein, wherein the computer readable program includes the computer code 514.

Generally, a computer program product (or, alternatively, an article of manufacture) of the computer system/device 500 may include the computer usable storage medium (or said program storage device). The processor 508 may represent one or more processors. The memory device 502 and/or the memory device 512 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block or step in the flowcharts or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to aid in training of a user interacting with a site level search engine to reduce a time for the search engine to perform a search based on input received from the user, said method comprising:

receiving from the user, by a computer having access to the search engine, one or more keywords or partial keywords entered by the user as a first search query to the search engine;

determining, by the computer, a list of complete sentences of a human language from a search history of previous searches, wherein each complete sentence includes the one or more keywords or partial keywords, wherein each complete sentence is a group of words combined in an arrangement according to predetermined syntax and semantics of a human language, wherein the syntax for each complete sentence is the arrangement of the words ensuring that each complete sentence is well-formed in the human language, and wherein each complete sentence is not a keyword, a partial keyword, a phrase, or a partial sentence;

presenting, by the computer to the user, the list of complete sentences;

after said presenting the list of complete sentences to the user, instructing, by the computer, the user to enter an additional complete sentence as a second search query that replaces the first search query;

receiving, by the computer from the user, the additional complete sentence;

performing, by the computer using the search engine, the second search query comprising the received additional complete sentence instead of performing the first search query, wherein performing the second search query produces more accurate search results for the user than does performing the first search query, wherein the second search query is performed in less time than a time required for performing the first search query, and wherein said performing the second search query comprises performing an Internet search with respect to the second search query;

after said determining the list of complete sentences and before said presenting the list of complete sentences to the user, determining, by the computer, that a total number of complete sentences, in the list of complete sentences, does not exceed a predetermined threshold total number of complete sentences and in response: finding, by the computer via a search of one or more online sources, additional complete sentences; enhancing, by the computer, the list of complete sentences by adding the additional complete sentences to the list of complete sentences; and determining, by the computer, that the total number of complete sentences, in the enhanced list of complete sentences, exceeds the predetermined threshold total number of complete sentences.

2. The method of claim 1, said method further comprising: populating, by the computer, a type-ahead dictionary of complete sentences including the one or more keywords or partial keywords.

3. The method of claim 2, wherein said determining the list of complete sentences comprises: searching, by the computer, the Internet to find complete sentences of the human language containing the one or more keywords or partial keywords and further populating the type-ahead dictionary with the found complete sentences.

4. The method of claim 2, said method further comprising: populating the type-ahead dictionary, by the computer, with a complete sentence entered by the user via the user interface.

5. The method of claim 1, wherein the complete sentences consists of N complete sentences, wherein N is at least 2, wherein for n=1, 2, . . . , N, the $n^{th}$ complete sentence in the list appears $T_n$ times in the search history of previous searches, and has a percent popularity that is equal to $100T_n/T_{sum}$ and is not less than a predetermined percent popularity threshold, wherein $T_{sum}$ is a summation over Tn from n=1 to n=N, said method further comprising:
ordering the list of complete sentences according to Tn (n=1, 2, . . . , N).

6. The method of claim 5, wherein the predetermined percent popularity threshold is approved by a system administrator.

7. The method of claim 1, wherein presenting the list of complete sentences further comprises: highlighting each keyword or partial keyword within each complete sentence.

8. A computer program product, comprising one or more computer readable hardware storage devices having computer readable program code stored therein, said program code containing instructions executable by a computer to implement a method to aid in training of users interacting with a site level search engine to reduce a time for the search engine to perform a search based on input received from the user, said method comprising:
receiving from the user, by the computer having access to the search engine, one or more keywords or partial keywords entered by the user as a first search query to the search engine;
determining, by the computer, a list of complete sentences of a human language from a search history of previous searches, wherein each complete sentence includes the one or more keywords or partial keywords, wherein each complete sentence is a group of words combined in an arrangement according to predetermined syntax and semantics of a human language, wherein the syntax for each complete sentence is the arrangement of the words ensuring that each complete sentence is well-formed in the human language, and wherein each complete sentence is not a keyword, a partial keyword, a phrase, or a partial sentence;
presenting, by the computer to the user, the list of complete sentences;
after said presenting the list of complete sentences to the user, instructing, by the computer, the user to enter an additional complete sentence as a second search query that replaces the first search query;
receiving, by the computer from the user, the additional complete sentence;
performing, by the computer using the search engine, the second search query comprising the received additional complete sentence instead of performing the first search query, wherein performing the second search query produces more accurate search results for the user than does performing the first search query, wherein the second search query is performed in less time than a time required for performing the first search query, and wherein said performing the second search query comprises performing an Internet search with respect to the second search query;
after said determining the list of complete sentences and before said presenting the list of complete sentences to the user, determining, by the computer, that a total number of complete sentences, in the list of complete sentences, does not exceed a predetermined threshold total number of complete sentences and in response:
finding, by the computer via a search of one or more online sources, additional complete sentences; enhancing, by the computer, the list of complete sentences by adding the additional complete sentences to the list of complete sentences; and determining, by the computer, that the total number of complete sentences, in the enhanced list of complete sentences, exceeds the predetermined threshold total number of complete sentence.

9. The computer program product of claim 8, said method further comprising: populating, by the computer, a type-ahead dictionary of complete sentences including the one or more keywords or partial keywords.

10. The computer program product of claim 9, wherein said determining the list of complete sentences comprises: searching, by the computer, the Internet to find complete sentences of the human language containing the one or more keywords or partial keywords and further populating the type-ahead dictionary with the found complete sentences.

11. The computer program product of claim 9, said method further comprising: populating the type-ahead dictionary, by the computer, with a complete sentence entered by the user via the user interface.

12. The computer program product of claim 8, wherein the complete sentences consists of N complete sentences, wherein N is at least 2, wherein for n=1, 2, . . . , N, the $n^{th}$ complete sentence in the list appears $T_n$ times in the search history of previous searches, and has a percent popularity that is equal to $100T_n/T_{sum}$ and is not less than a predetermined percent popularity threshold, wherein $T_{sum}$ is a summation over Tn from n=1 to n=N, said method further comprising:
ordering the list of complete sentences according to Tn (n=1, 2, . . . , N).

13. The computer program product of claim 12, wherein the predetermined percent popularity threshold is approved by a system administrator.

14. The computer program product of claim 8, wherein presenting the list of complete sentences further comprises: highlighting each keyword or partial keyword within each complete sentence.

15. A computer system, comprising a computer, said computer comprising one or more processors, one or more memories, and one or more computer readable hardware storage devices, said one or more hardware storage devices containing program code executable by the one or more processors via the one or more memories to implement a method to aid in training of users interacting with a site level search engine to reduce a time for the search engine to perform a search based on input received from the user, said method comprising:
receiving from the user, by the computer having access to the search engine, one or more keywords or partial keywords entered by the user as a first search query to the search engine;
determining, by the computer, a list of complete sentences of a human language from a search history of previous searches, wherein each complete sentence includes the one or more keywords or partial keywords, wherein each complete sentence is a group of words combined in an arrangement according to predetermined syntax and semantics of a human language, wherein the syntax for each complete sentence is the arrangement of the words ensuring that each complete sentence is well-formed in the human language, and wherein each complete sentence is not a keyword, a partial keyword, a phrase, or a partial sentence;

presenting, by the computer to the user, the list of complete sentences;

after said presenting the list of complete sentences to the user, instructing, by the computer, the user to enter an additional complete sentence as a second search query that replaces the first search query;

receiving, by the computer from the user, the additional complete sentence;

performing, by the computer using the search engine, the second search query comprising the received additional complete sentence instead of performing the first search query, wherein performing the second search query produces more accurate search results for the user than does performing the first search query, wherein the second search query is performed in less time than a time required for performing the first search query, and wherein said performing the second search query comprises performing an Internet search with respect to the second search query;

after said determining the list of complete sentences and before said presenting the list of complete sentences to the user, determining, by the computer, that a total number of complete sentences, in the list of complete sentences, does not exceed a predetermined threshold total number of complete sentences and in response: finding, by the computer via a search of one or more online sources, additional complete sentences; enhancing, by the computer, the list of complete sentences by adding the additional complete sentences to the list of complete sentences; and determining, by the computer, that the total number of complete sentences, in the enhanced list of complete sentences, exceeds the predetermined threshold total number of complete sentence.

16. The computer system of claim 15, said method further comprising:

populating, by the computer, a type-ahead dictionary of complete sentences including the one or more keywords or partial keywords.

17. The computer system of claim 16, wherein said determining the list of complete sentences comprises: searching, by the computer, the Internet to find complete sentences of the human language containing the one or more keywords or partial keywords and further populating the type-ahead dictionary with the found complete sentences.

* * * * *